United States Patent
Cheng

(10) Patent No.: US 10,165,520 B2
(45) Date of Patent: Dec. 25, 2018

(54) MOBILE COMMUNICATION TERMINAL AND SIGNAL TRANSMISSION METHOD OF MOBILE COMMUNICATION TERMINAL

(71) Applicant: ZTE CORPORATION, Shenzhen, Guangdong Province (CN)

(72) Inventor: Shougang Cheng, Shenzhen (CN)

(73) Assignee: XI'AN ZHONGXING NEW SOFTWARE CO., LTD. (CN)

(*) Notice: Subject to any disclaimer, the term of this patent is extended or adjusted under 35 U.S.C. 154(b) by 53 days.

(21) Appl. No.: 15/314,229

(22) PCT Filed: Jul. 30, 2014

(86) PCT No.: PCT/CN2014/083295
§ 371 (c)(1),
(2) Date: Nov. 28, 2016

(87) PCT Pub. No.: WO2015/180257
PCT Pub. Date: Dec. 3, 2015

(65) Prior Publication Data
US 2017/0201951 A1    Jul. 13, 2017

(30) Foreign Application Priority Data
May 28, 2014 (CN) .......................... 2014 1 0231282

(51) Int. Cl.
*H04W 52/24* (2009.01)
*H04B 7/08* (2006.01)
(Continued)

(52) U.S. Cl.
CPC .......... *H04W 52/24* (2013.01); *H04B 7/0608* (2013.01); *H04B 7/0825* (2013.01); *H04W 52/42* (2013.01)

(58) Field of Classification Search
CPC .... H04W 52/24; H04B 7/0608; H04B 7/0825
See application file for complete search history.

(56) References Cited

U.S. PATENT DOCUMENTS

2006/0135079 A1* 6/2006 Barnett ................ H04B 7/0608
                                                                455/69
2013/0316662 A1* 11/2013 Bengtsson ........... H04B 7/0874
                                                                455/77
(Continued)

FOREIGN PATENT DOCUMENTS

CN        101848020 A     9/2010
CN        103249133 A     8/2013
(Continued)

OTHER PUBLICATIONS

European Search Report dated Apr. 4, 2017 for EP Application No. 14892928.4.
(Continued)

*Primary Examiner* — Redentor Pasia
(74) *Attorney, Agent, or Firm* — Plumsea Law Group, LLC

(57) ABSTRACT

Disclosed by the embodiments of the present document are a mobile communication terminal including a signal output module, a main antenna module, a diversity antenna module, an acquisition module, a control module and a radio-frequency switching module, and a signal transmission method. The acquisition module is used to acquire transmitting power P1 of a transmitted signal when the signal output module generates the transmitted signal to transmit through the main antenna module, and acquire transmission capabilities of the main antenna module and the diversity antenna module when P1 is greater than a first preset value. The control module outputs a corresponding control signal to the radio-frequency switching module according to the transmission capabilities of the main antenna module and the diversity antenna module; and the radio-frequency switching module controls the output module to be con- (Continued)

nected with the main antenna module or the diversity antenna module according to the control signal.

10 Claims, 4 Drawing Sheets

(51) Int. Cl.
*H04B 7/06* (2006.01)
*H04W 52/42* (2009.01)

(56) References Cited

U.S. PATENT DOCUMENTS

| | | | | |
|---|---|---|---|---|
| 2014/0162574 A1* | 6/2014 | Rousu | ................... | H04W 52/04 455/78 |
| 2014/0233665 A1* | 8/2014 | Clevorn | ................... | H04B 7/04 375/267 |
| 2015/0188599 A1* | 7/2015 | Shi | ........................... | H04L 1/18 455/78 |
| 2017/0201951 A1 | 7/2017 | Cheng | | |

FOREIGN PATENT DOCUMENTS

| | | |
|---|---|---|
| CN | 103414507 A | 11/2013 |
| CN | 103648189 A | 3/2014 |
| EP | 2434681 A1 | 3/2012 |
| EP | 3139670 A | 3/2017 |
| KR | 20060118771 A | 11/2006 |
| WO | 2015/180257 A1 | 12/2015 |

OTHER PUBLICATIONS

Office Action dated Oct. 2, 2017 for Canadian Patent Application No. 2,950,324.
International Search Report and Written Opinion dated Feb. 17, 2015 for PCT Application No. PCT/CN2014/083295.

* cited by examiner

MOBILE COMMUNICATION TERMINAL AND SIGNAL TRANSMISSION METHOD OF MOBILE COMMUNICATION TERMINAL

CROSS-REFERENCE TO RELATED APPLICATION(S)

This application is the U.S. National Phase application of PCT application number PCT/CN2014/083295 having a PCT filing date of Jul. 30, 2014, which claims priority of Chinese patent application 201410231282.6 filed on May 28, 2014, the disclosures of which are hereby incorporated by reference.

TECHNICAL FIELD

The present document relates to the field of mobile communication, in particular to a mobile communication terminal and a signal transmission method of the mobile communication terminal.

BACKGROUND OF RELATED ART

Since mobile communication terminals are affected by technical limitations such as small antenna size and environmental factors such as complex use environment and incomplete network coverage, users usually encounter the problem of poor call quality and communication quality. With the construction of 4G network, the same mobile communication terminal needs to simultaneously support various systems and various frequency bands such as 2G, 3G, 4G, wifi and Bluetooth. At this moment, it is very difficult to make the efficiency of an antenna very good, such that the problem of poor communication quality is comparatively serious. How to improve call performance and communication quality in a limited space of a mobile phone is an eternal pursue of antenna design engineers and radio-frequency engineers. As known by one skilled in the art, communication between a mobile communication terminal and a base station is completed through data interaction in an uplink and a downlink. Herein, the downlink generally refers to the link where the base station transmits signals and the mobile communication terminal receives the signals. The uplink generally refers to the link where a mobile phone transmits signals and the base station receives the signals. The influence of the uplink and downlink on communication quality is very critical. As found in studies, quite a lot of call block problems are caused by a reason that the propagation loss of uplink signals transmitted by the mobile phone is so great that the uplink signals cannot be correctly demodulated by the base station.

SUMMARY

The main purpose of the embodiments of the present document is to decrease the loss of signals transmitted from a mobile communication terminal to a base station, in order to improve the call quality of the mobile communication terminal.

In order to realize the purpose, an embodiment of the present document provides a mobile communication terminal. The mobile communication terminal includes a signal output module, a main antenna module, a diversity antenna module, an acquisition module, a control module and a radio-frequency switching module, herein the radio-frequency switching module includes a common end, a controlled end, a first connection end and a second connection end, and the acquisition module includes a first signal acquisition end, a second signal acquisition end, a third signal acquisition end and an acquired signal output end; the common end is connected with a transmitted signal output end of the signal output module, the controlled end is connected with a control signal output end of the control module, the first connection end is connected with the main antenna module and the second connection end is connected with the diversity antenna module; the first signal acquisition end is connected with a transmitting power output end of the signal output module, the second signal acquisition end is connected with the main antenna module, the third signal acquisition end is connected with the diversity antenna module and the acquired signal output end is connected with a signal receiving end of the control module;

the acquisition module is configured to acquire transmitting power P1 of a transmitted signal when the signal output module generates the transmitted signal and transmits the signal through the main antenna module, and acquire transmission capabilities of the main antenna module and the diversity antenna module when the transmitting power P1 is greater than a first preset value;

the control module is configured to output a corresponding control signal to the radio-frequency switching module according to the transmission capabilities of the main antenna module and the diversity antenna module; and the radio-frequency switching module is configured to control the signal output module to be connected with the main antenna module or the diversity antenna module according to the control signal.

Alternatively, the transmission capabilities of the main antenna module and the diversity antenna module include received signal quality and received signal strength.

Alternatively, the control module includes a mean value acquisition unit, a judgment unit and a control signal output unit, herein, the mean value acquisition unit is configured to acquire a mean value A1 of received signal quality of the main antenna module, a mean value A2 of received signal strength of the main antenna module, a mean value B1 of received signal quality of the diversity antenna module and a mean value B2 of received signal strength of the diversity antenna module;

the judgment unit is configured to judge whether the B1 is greater than the A1;

the acquisition module is further configured to, when the B1 is smaller than or equal to the A1, execute the operation of acquiring transmitting power P1 of a transmitted signal generated by the signal output module when the signal output module generates the transmitted signal and transmits the signal through the main antenna module;

the judgment unit is further configured to, when the B1 is greater than the A1, judge whether a difference value between the B2 and the A2 is greater than or equal to a second preset value;

the control signal output unit is configured to, when the judgment unit judges that the difference value between the B2 and the A2 is greater than or equal to the second preset value, output a corresponding control signal to control the radio-frequency switching module to perform connection state switching processing of the signal output module to make the signal output module be connected with the diversity antenna module; and the acquisition module is further configured to, when the judgment unit judges that the difference value between the B2 and the A2 is smaller than the second preset value, execute the operation of acquiring transmitting power P1 of a transmitted signal generated by the signal output module when the signal output module generates the transmitted signal and transmits the signal through the main antenna module.

Alternatively, the acquisition module is further configured to acquire transmitting power P2 of the transmitted signal when the signal output module generates the transmitted signal and transmits the signal through the diversity antenna module;

the judgment unit is further configured to judge whether the P2 is greater than the P1;

the acquisition module is further configured to, when the P2 is smaller than or equal to the P1, execute an operation of acquiring the transmitting power P2 of the transmitted signal when the signal output module generates the transmitted signal and transmits the signal through the diversity antenna module; and the control module is further configured to, when the P2 is greater than the P1, output a corresponding control signal to the radio-frequency switching module to control the signal output module to be connected with the main antenna module.

Alternatively, the control module is further configured to, when outputting the corresponding control signal to the radio-frequency switching module to control the signal output module to be connected with the main antenna module when the transmitting power P2 is greater than the P1, increase the second preset value.

Moreover, in order to realize the purpose, an embodiment of the present document further provides a signal transmission method of a mobile communication terminal. The signal transmission method of the mobile communication terminal includes the following steps:

acquiring the transmitting power P1 of the transmitted signal generated by the signal output module when the signal output module generates the transmitted signal and transmits the signal through the main antenna module;

acquiring transmission capabilities of the main antenna module and the diversity antenna module when the transmitting power P1 is greater than the first preset value; and outputting the corresponding control signal according to the transmission capabilities of the main antenna module and the diversity antenna module to control the radio-frequency switching module to perform connection state switching processing of the signal output module to make the signal output module be connected with the main antenna module or the diversity antenna module.

Alternatively, the transmission capabilities of the main antenna module and the diversity antenna module include received signal strength and received signal quality.

Alternatively, the step of outputting the corresponding control signal according to the transmission capabilities of the main antenna module and the diversity antenna module to control the radio-frequency switching module to perform connection state switching processing of the signal output module to make the signal output module be connected with the diversity antenna module specifically includes:

acquiring a mean value A1 of received signal quality of the main antenna module, a mean value A2 of received signal strength of the main antenna module, a mean value B1 of received signal quality of the diversity antenna module and a mean value B2 of received signal strength of the diversity antenna module;

judging whether the B1 is greater than the A1;

when the B1 is smaller than or equal to the A1, returning to execute the step of acquiring the transmitting power P1 of the transmitted signal generated by the signal output module when the signal output module generates the transmitted signal and transmits the signal through the main antenna module;

when the B1 is greater than the A1, judging whether a difference value between the B2 and the A2 is greater than or equal to a second preset value;

when the difference value between the B2 and the A2 is greater than or equal to the second preset value, outputting a corresponding control signal to control the radio-frequency switching module to perform the connection state switching processing of the signal output module to make the signal output module be connected with the diversity antenna module; and when the difference value between the B2 and the A2 is smaller than the second preset value, returning to execute the step of acquiring the transmitting power P1 of the transmitted signal generated by the signal output module when the signal output module transmits the signal through the main antenna module.

Alternatively, after the step of outputting the corresponding control signal to control the radio-frequency switching module to perform the connection state switching processing of the signal output module to make the signal output module be connected with the diversity antenna module when the difference value between the B2 and the A2 is greater than or equal to the second preset value, the signal transmission method further includes:

after a preset time period, acquiring transmitting power P2 of the transmitted signal when the signal output module generates the transmitted signal and transmits the signal through the diversity antenna module;

when the P2 is smaller than or equal to the P1, returning to execute the step of acquiring transmitting power P2 of the transmitted signal when the signal output module generates the transmitted signal and transmits the signal through the diversity antenna module; and when the P2 is greater than the P1, outputting a corresponding control signal to the radio-frequency switching module to control the signal output module to be connected with the main antenna module.

Alternatively, when executing the step of outputting a corresponding control signal to the radio-frequency switching module to control the signal output module to be connected with the main antenna module when the P2 is greater than the P1, the second preset value is increased.

According to the mobile communication terminal provided by the embodiment of the present document, by adding the acquisition module, the control module and the radio-frequency switching module, when the signal output module is connected with the main antenna module and transmits the signal through the main antenna module, the acquisition module acquires the transmitting power of the transmitted signal. When the transmitting power is greater than the first preset value, the acquisition module acquires the transmission capabilities of the main antenna module and the diversity antenna module. The control module analyzes the transmission capabilities of the main antenna module and the diversity antenna module. When the transmission capability of the diversity antenna module is superior to the transmission capability of the main antenna module, the control module outputs the control signal to the radio-frequency switching module to make the signal output module be connected with the diversity antenna module having the superior transmission capability, such that the transmitted signal can be transmitted through the superior transmitting link, thereby the loss of the signal transmitted from the mobile communication terminal to the base station is decreased and the call quality of the mobile communication terminal is improved. On the other hand, when the loss of the transmitting link is decreased, the transmitting power of the transmitted signal is correspondingly decreased, thereby the loss of energy for transmission of the mobile communication terminal can be reduced and the time of endurance of the mobile communication terminal is prolonged.

The realization of the purpose, the function features and the advantages of the present document will be further described in combination with the embodiments with reference to the drawings.

PREFERRED EMBODIMENTS

Figure 1:
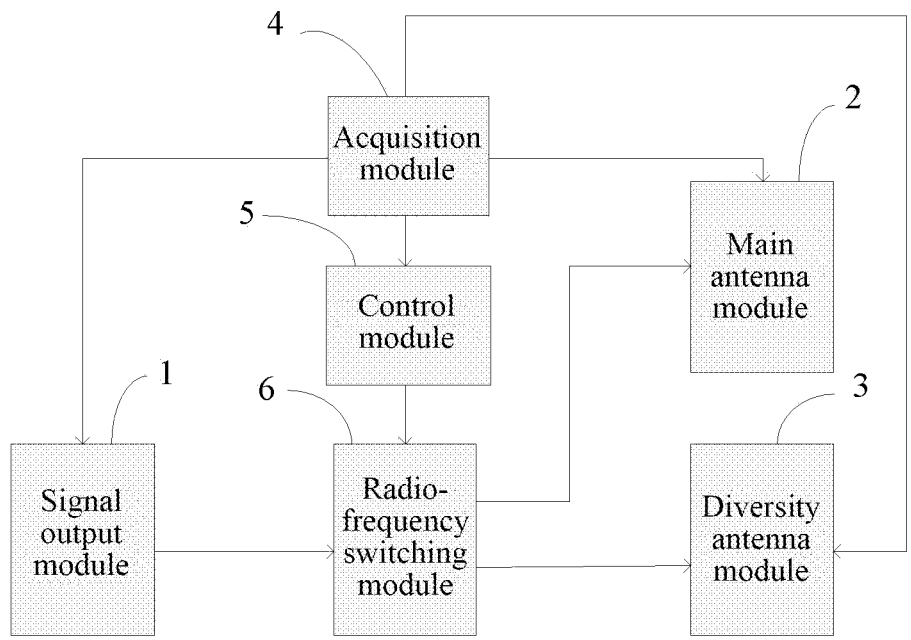
FIG. 1 illustrates a schematic diagram of modules of a mobile communication terminal according to an embodiment of the present document.

The preferred embodiments of the present document will be described below in detail with reference to the drawings. It needs to be stated that the embodiments in the present application and the features in the embodiments may be mutually and freely combined under the situation of no conflict. Referring to FIG. 1, the FIG. 1 illustrates a schematic diagram of modules of a mobile communication terminal according to an embodiment of the present document. The embodiment provides a mobile communication terminal. The mobile communication terminal includes a signal output module 1, a main antenna module 2, a diversity antenna module 3, an acquisition module 4, a control module 5 and a radio-frequency switching module 6.

The acquisition module 4 includes a first signal acquisition end, a second signal acquisition end, a third signal acquisition end and an acquired signal output end. The radio-frequency switching module 6 includes a common end, a controlled end, a first connection end and a second connection end. The common end is connected with a transmitted signal output end of the signal output module 1, the controlled end is connected with a control signal output end of the control module 5, the first connection end is connected with the main antenna module 2 and the second connection end is connected with the diversity antenna module 3. The first signal acquisition end is connected with a transmitting power output end of the signal output module 1, the second signal acquisition end is connected with the main antenna module 2, the third signal acquisition end is connected with the diversity antenna module 3 and the acquired signal output end is connected with a signal receiving end of the control module 5.

In the embodiment, after the signal output module 1 establishes a communication link with a base station, the signal output module 1 generates a transmitted signal. Since a communication uplink between the mobile communication terminal and the base station adopts closed loop power control, the base station outputs a control command according to the received transmitted signal to require the mobile communication terminal to increase or decrease transmitting power. It should be stated that, when the transmission loss of the signal between the mobile communication terminal and the base station is relatively great, the transmitting power of the transmitted signal received by the base station is relatively small. At the moment, the base station outputs a control command to require the mobile communication terminal to increase the transmitting power. So, the mobile communication terminal increases the transmitting power at the next time of signal transmission. The greater the transmitting power of the mobile communication terminal is, the greater the loss of the transmitting link between the mobile communication terminal and the base station is. The smaller the transmitting power of the mobile communication terminal is, the smaller the loss of the transmitting link between the mobile communication terminal and the base station is. Generally, an internal mechanism of the mobile communication terminal requires that the transmitting power does not exceed a preset maximum transmitting power thereof under any circumstances. The transmitting power of the mobile communication terminal is the transmitting power of the transmitted signal generated by the signal output module 1. The main antenna module 2 and the diversity antenna module 3 cover receiving frequency and transmitting frequency of the mobile communication terminal. Herein, the main antenna module 2 is a main signal receiving and transmitting channel of the mobile communication terminal. The diversity antenna module 3 is a second receiving channel and a standby transmitting channel. It should be stated that, when the mobile communication terminal and the base station establish a communication link, the signal output module 1 is connected with the main antenna module 2 and transmits the signal through the main antenna module 2. When the main antenna module 2 cannot transmit the signal or the loss of the transmitted signal is relatively great, the signal output module 1 is connected with the diversity antenna module 3 and transmits the signal to the base station through the diversity antenna module 3.

The acquisition module 4 is configured to acquire transmitting power P1 of a transmitted signal when the signal output module 1 generates the transmitted signal and transmits the signal through the main antenna module 2, and acquire transmission capabilities of the main antenna module 2 and the diversity antenna module 3 when the transmitting power P1 is greater than a first preset value.

In the embodiment, the acquisition module 4 acquires transmitting power P1 of a transmitted signal when the signal output module 1 generates the transmitted signal and transmits the signal through the main antenna module 2. The acquisition module 4 acquires the transmission capabilities of the main antenna module 2 and the diversity antenna module 3 when the transmitting power P1 is greater than a first preset value. It should be stated that the first preset value may be set according to the actual situation. In the embodiment, the transmission capabilities of the main antenna module 2 and the diversity antenna module 3 includes received signal quality and received signal strength. The acquisition module 4 acquires the transmission capability of the main antenna module 2 by acquiring the received signal strength and the received signal quality of the main antenna module 2. Similarly, the acquisition module 4 acquires the transmission capability of the diversity antenna module 3 by acquiring the received signal strength and the received signal quality of the diversity antenna module 3.

The control module 5 outputs a corresponding control signal to the radio-frequency switching module 6 according to the transmission capabilities of the main antenna module 2 and the diversity antenna module 3.

In the embodiment, the control module 5 receives the transmission capability of the main antenna module 2 and the transmission capability of the diversity antenna module 3 which are output by the acquisition module 4, and analyzes the received transmission capabilities. When the control module 5 analyzes and obtains that the transmission capability of the main antenna module 2 is superior to the transmission capability of the diversity antenna module 3, the control module 5 outputs a first control signal to the radio-frequency switching module 6. When the control module 5 analyzes and obtains that the transmission capability of the diversity antenna module 3 is superior to the transmission capability of the main antenna module 2, the control module 5 outputs a second control signal to the radio-frequency switching module 6.

The radio-frequency switching module 6 controls the signal output module 1 to be connected with the main antenna module 2 or the diversity antenna module 3 according to the control signal.

In the embodiment, the radio-frequency switching module 6 is configured to receive the control signal output by the control module 5 and switches a connection state of the signal output module 1 according to the received control signal. It should be stated that the connection state of the signal output module 1 includes: the signal output module 1 is connected with the main antenna module 2 and the signal output module 1 is connected with the diversity antenna module 3. When the radio-frequency switching module 6 receives the first control signal output by the control module 5, the radio-frequency switching module 6 controls the signal output module 1 to be connected with the main antenna module 2. When the radio-frequency switching module 6 receives the second control signal output by the control module 5, the radio-frequency switching module 6 controls the signal output module 1 to be connected with the diversity antenna module 3. It should be stated that a radio-frequency switch may be a duplexer or a double-throw switch or the like.

According to the mobile communication terminal provided by the embodiment of the present document, by adding the acquisition module 4, the control module 5 and the radio-frequency switching module 6, when the signal output module 1 is connected with the main antenna module 2 and transmits the signal through the main antenna module 2, the acquisition module 4 acquires the transmitting power P1 of the transmitted signal. When the transmitting power P1 is greater than the first preset value, the acquisition module 4 acquires the transmission capabilities of the main antenna module 2 and the diversity antenna module 3. The control module 5 analyzes the transmission capabilities of the main antenna module 2 and the diversity antenna module 3; and when the transmission capability of the diversity antenna module 3 is superior to the transmission capability of the main antenna module 2, the control module 5 outputs the control signal to the radio-frequency switching module 6 to make the signal output module 1 be connected with the diversity antenna module 3 having the superior transmission capability, such that the transmitted signal can be transmitted through the superior transmitting link, thereby the loss of the signal transmitted from the mobile communication terminal to the base station is decreased and the call quality of the mobile communication terminal is improved. On the other hand, when the loss of the transmitting link is decreased, the transmitting power of the transmitted signal is correspondingly decreased, thereby the loss of energy for transmission of the mobile communication terminal can be reduced and the time of endurance of the mobile communication terminal is prolonged.

Figure 2:
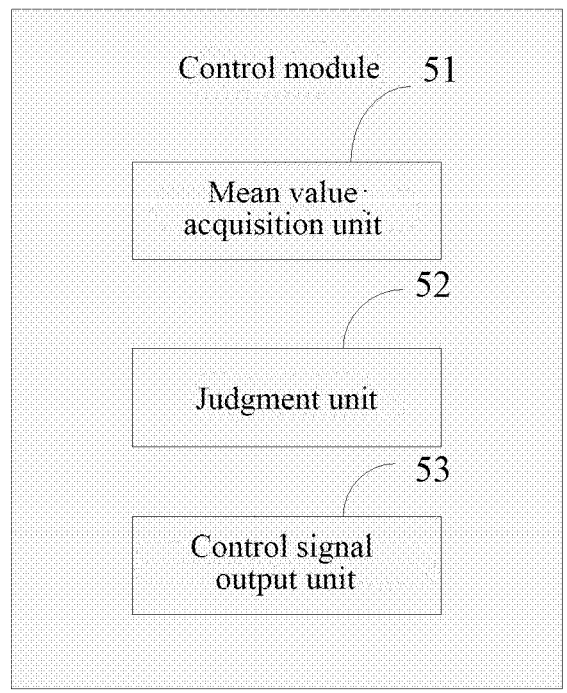
FIG. 2 illustrates a schematic diagram of modules of a control module in FIG. 1.

Further referring to FIG. 2, the FIG. 2 illustrates a schematic diagram of modules of a control module in FIG. 1. The control module 5 includes a mean value acquisition unit 51, a judgment unit 52 and a control signal output unit 53. Herein, the mean value acquisition unit 51 is configured to acquire a mean value A1 of received signal quality of the main antenna module 2, a mean value A2 of received signal strength of the main antenna module 2, a mean value B1 of received signal quality of the diversity antenna module 3 and a mean value B2 of received signal strength of the diversity antenna module 3;

the judgment unit 52 is configured to judge whether B1 is greater than A1;

the acquisition module 4 is further configured to, when B1 is smaller than or equal to A1, execute an operation of acquiring the transmitting power P1 of the transmitted signal generated by the signal output module 1 when the signal output module 1 generates the transmitted signal and transmits the signal through the main antenna module 2;

the judgment unit 52 is further configured to, when B1 is greater than A1, judge whether a difference value between B2 and A2 is greater than or equal to a second preset value D;

the control signal output unit 53 is configured to, when the judgment unit 52 judges that the difference value between B2 and A2 is greater than or equal to the second preset value D, output a control signal to control the radio-frequency switching module 6 to perform connection state switching processing of the signal output module 1 to make the signal output module 1 be connected with the diversity antenna module 3; and the acquisition module 4 is further configured to, when the judgment unit 52 judges that the difference value between B2 and A2 is smaller than the second preset value D, execute the operation of acquiring the transmitting power P1 of the transmitted signal generated by the signal output module when the signal output module 1 generates the transmitted signal and transmits the signal through the main antenna module 2.

In the embodiment, it should be stated that, the better the received signal quality and the received signal strength of the main antenna module 2 are, the stronger the transmission capability thereof is. Similarly, the better the received signal quality and the received signal strength of the diversity antenna module 3 are, the stronger the transmission capability thereof is. When the signal output module 1 is connected with the main antenna module 2 and transmits the signal through the main antenna module 2, if the transmitting power P1 of the transmitted signal is greater than the first preset value, the loss of the signal transmitting link is relatively great. In order to reduce the loss of the transmitted signal, the control module 5 performs an operation of analyzing the transmission capabilities of the main antenna module 2 and the diversity antenna module 3, and specifically judges which one of the main antenna module 2 and the diversity antenna module 3 has superior received signal strength and received signal quality. When the received signal strength and the received signal quality of the diversity antenna module 3 are superior to the received signal strength and the received signal quality of the main antenna module 2, the signal output unit 53 is controlled to output a corresponding control signal to the radio-frequency switching module 6 to make the signal output module 1 be connected with the diversity antenna module 3 having the superior transmission capability, such that the loss of the transmitted signal is decreased and the call quality of the mobile communication terminal is improved. On the other hand, when the loss of the transmitting link is decreased, the transmitting power of the transmitted signal is correspondingly decreased, thereby the loss of energy for transmission of the mobile communication terminal can be reduced and the time of endurance of the mobile communication terminal is prolonged.

The acquisition module 4 is further configured to acquire transmitting power P2 of the transmitted signal when the signal output module 1 generates the transmitted signal and transmits the signal through the diversity antenna module 3.

The judgment unit 52 is further configured to judge whether P2 is greater than P1.

The acquisition module 4 is further configured to, when the transmitting power P2 is smaller than or equal to P1, execute an operation of acquiring the transmitting power P2 of the transmitted signal when the signal output module 1 generates the transmitted signal and transmits the signal through the diversity antenna module 3.

The control module 5 is further configured to, when the transmitting power P2 is greater than P1, output a corresponding control signal to the radio-frequency switching module 6 to control the signal output module 1 to be connected with the main antenna module 2.

In the embodiment, after the radio-frequency switching module 6 controls the signal output module 1 to be switched from a state that the signal output module 1 is connected with the main antenna module 2 to a state that the signal output module 1 is connected with the diversity antenna module 3, the acquisition module 4 acquires the transmitting power P2 of the signal transmitted by the signal output module 1 through the diversity antenna module 3. If P2 is greater than P1, it indicates that the loss of the signal transmitted through the diversity antenna module 3 is greater than the loss of the signal transmitted through the main antenna module 2. Then, the control signal output unit 53 outputs a control signal to the radio-frequency switching module 6 to control the signal output module 1 to be switched back to the state of being connected with the main antenna module 2. If P2 is smaller than or equal to P1, it indicates that the loss of the signal transmitted through the diversity antenna module 3 is smaller than the loss of the signal transmitted through the main antenna module 2. The signal output module 1 may still continue transmitting the signal through the diversity antenna module 3. The acquisition module 4 continually acquires the transmitting power. Once the transmitting power P2 is greater than P1, the signal output module 1 is switched back to the state of being connected with the main antenna module 2 to transmit the signal, such that the optimum transmitting link can be effectively acquired and the loss of the signal transmitted from the mobile communication terminal to the base station is decreased.

The control module 5 is further configured to, when outputting the corresponding control signal to the radio-frequency switching module 6 to control the signal output module 1 to be connected with the main antenna module 2 when the transmitting power P2 is greater than P1, increase the second preset value D.

In the embodiment, after the signal output module 1 is switched from the state of being connected with the main antenna module 2 to the state of being connected with the diversity antenna module 3, when the control module 5 detects that the transmitting power P2 of the signal transmitted by the signal output module 1 through the diversity antenna module 3 is greater than the transmitting power P1 before switching, the second preset value D is increased. In the embodiment, the second preset value D is increased by one. The second preset value D is used as a correction value, increasing the second preset value D can decrease the error when the judgment unit 52 judges the transmission capabilities of the main antenna module 2 and the diversity antenna module 3 at a next time, such that the judgment is prevented from entering an endless loop and the judgment accuracy of the transmission capabilities is improved. By increasing the second preset value D, it is guaranteed that the signal of the mobile communication terminal can be transmitted through the optimum transmitting link, the loss of the signal is decreased and the call quality of the mobile communication terminal is improved.

The embodiment of the present document provides a signal transmission method of a mobile communication terminal.

Figure 3:
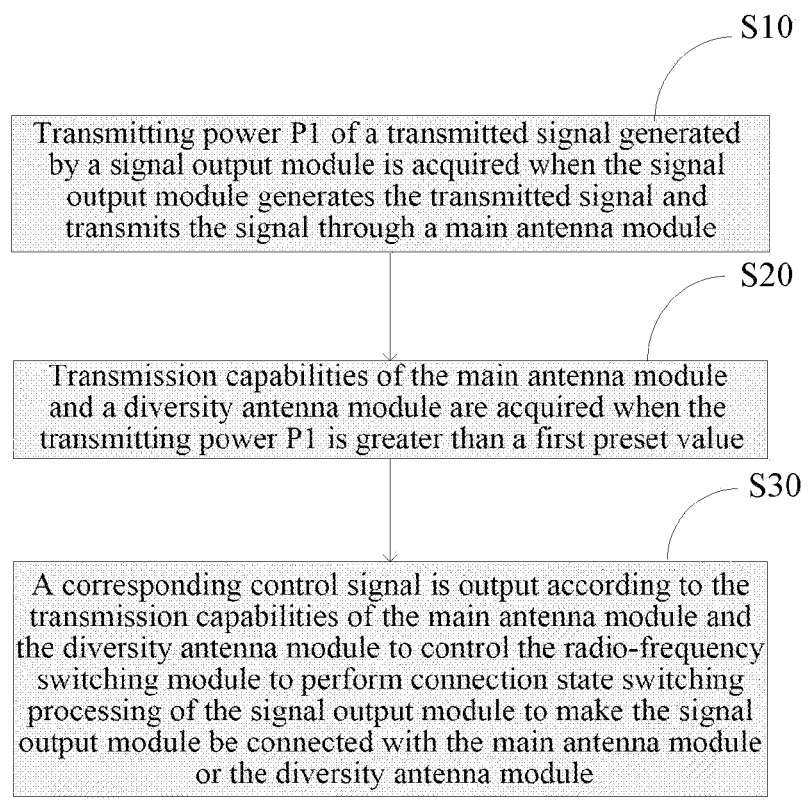
FIG. 3 illustrates a flowchart of one embodiment of a signal transmission method of the mobile communication terminal according to the present document.

Referring to FIG. 3, the FIG. 3 illustrates a flowchart of one embodiment of a signal transmission method of a mobile communication terminal according to the present document. The signal transmission method of the mobile communication terminal provided by the embodiment includes the following steps:

In step S10, transmitting power P1 of a transmitted signal generated by a signal output module 1 is acquired when the signal output module 1 generates the transmitted signal and transmits the signal through a main antenna module 2.

In step S20, transmission capabilities of the main antenna module and a diversity antenna module are acquired when the transmitting power P1 is greater than a first preset value.

In the embodiment, after the signal output module 1 establishes a communication link with a base station, the signal output module 1 generates a transmitted signal. Since a communication uplink between the mobile communication terminal and the base station adopts closed loop power control, the base station outputs a control command according to the received transmitted signal to require the mobile communication terminal to increase or decrease transmitting power. It should be stated that, when the transmission loss of the signal between the mobile communication terminal and the base station is relatively great, the transmitting power of the transmitted signal received by the base station is relatively small. At this moment, the base station outputs a control command to require the mobile communication terminal to increase the transmitting power. So, the mobile communication terminal increases the transmitting power at a next time of signal transmission. The greater the transmitting power of the mobile communication terminal is, the greater the loss of the transmitting link between the mobile communication terminal and the base station is. The smaller the transmitting power of the mobile communication terminal is, the smaller the loss of the transmitting link between the mobile communication terminal and the base station is. Generally, an internal mechanism of the mobile communication terminal requires that the transmitting power does not exceed a preset maximum transmitting power thereof under any circumstances. The transmitting power of the mobile communication terminal is the transmitting power of the transmitted signal generated by the signal output module 1. The main antenna module 2 and the diversity antenna module 3 cover receiving frequency and transmitting frequency of the mobile communication terminal. Herein, the main antenna module 2 is a main signal receiving and transmitting channel of the mobile communication terminal. The diversity antenna module 3 is a second receiving channel and a standby transmitting channel. It should be stated that, when the mobile communication terminal and the base station establish a communication link, the signal output module 1 is connected with the main antenna module 2 and transmits the signal through the main antenna module 2. When the main antenna module 2 cannot transmit the signal or the loss of the transmitted signal is relatively great, the signal output module 1 is connected with the diversity antenna module 3 and transmits the signal to the base station through the diversity antenna module 3.

Transmitting power P1 of a transmitted signal is acquired when the signal output module 1 generates the transmitted signal and transmits the signal through the main antenna module 2. Transmission capabilities of the main antenna module 2 and the diversity antenna module 3 are acquired when the transmitting power P1 is greater than a first preset value. It should be stated that the first preset value may be set according to the actual situation. In the embodiment, the transmission capabilities of the main antenna module 2 and the diversity antenna module 3 include received signal quality and received signal strength. The transmission capability of the main antenna module 2 is acquired by acquiring the received signal strength and the received signal quality of the main antenna module 2. Similarly, the transmission capability of the diversity antenna module 3 is acquired by acquiring the received signal strength and the received signal quality of the diversity antenna module 3.

In step S30, a corresponding control signal is output according to the transmission capabilities of the main antenna module 2 and the diversity antenna module 3 to control a radio-frequency switching module 6 to perform connection state switching processing of the signal output module 1 to make the signal output module 1 be connected with the main antenna module 2 or the diversity antenna module 3.

In the embodiment, the transmission capabilities of the main antenna module 2 and the transmission capability of the diversity antenna module 3 are received, and the received transmission capabilities are analyzed. When it is to analyze and obtain that the transmission capability of the main antenna module 2 is superior to the transmission capability of the diversity antenna module 3, a first control signal is output to the radio-frequency switching module 6. When the transmission capability of the diversity antenna module 3 is superior to the transmission capability of the main antenna module 2, a second control signal is output to the radio-frequency switching module 6.

The radio-frequency switching module 6 is configured to receive the control signal and switches a connection state of the signal output module 1 according to the received control signal. It should be stated that the connection state of the signal output module 1 includes: the signal output module 1 is connected with the main antenna module 2 and the signal output module 1 is connected with the diversity antenna module 3. When the radio-frequency switching module 6 receives the first control signal, the radio-frequency switching module 6 controls the signal output module 1 to be connected with the main antenna module 2. When the radio-frequency switching module 6 receives the second control signal, the radio-frequency switching module 6 controls the signal output module 1 to be connected with the diversity antenna module 3. It should be stated that a radio-frequency switch may be a duplexer or a double-throw switch or the like.

According to the mobile communication terminal provided by the embodiment of the present document, when the signal output module 1 is connected with the main antenna module 2 and transmits the signal through the main antenna module 2, the transmitting power P1 of the transmitted signal is acquired. When the transmitting power P1 is greater than the first preset value, the transmission capabilities of the main antenna module 2 and the diversity antenna module 3 are acquired. The corresponding control signal is output according to the transmission capabilities of the main antenna module 2 and the diversity antenna module 3. When the transmission capability of the diversity antenna module 3 is superior to the transmission capability of the main antenna module 2, the control signal is output to the radio-frequency switching module 6 to make the signal output module 1 be connected with the diversity antenna module 3 having the superior transmission capability, such that the transmitted signal can be transmitted through the superior transmitting link, thereby the loss of the signal transmitted from the mobile communication terminal to the base station is decreased. On the other hand, when the loss of the transmitting link is decreased, the transmitting power of the transmitted signal is correspondingly decreased, thereby the loss of energy for transmission of the mobile communication terminal can be reduced and the time of endurance of the mobile communication terminal is prolonged.

Figure 4:
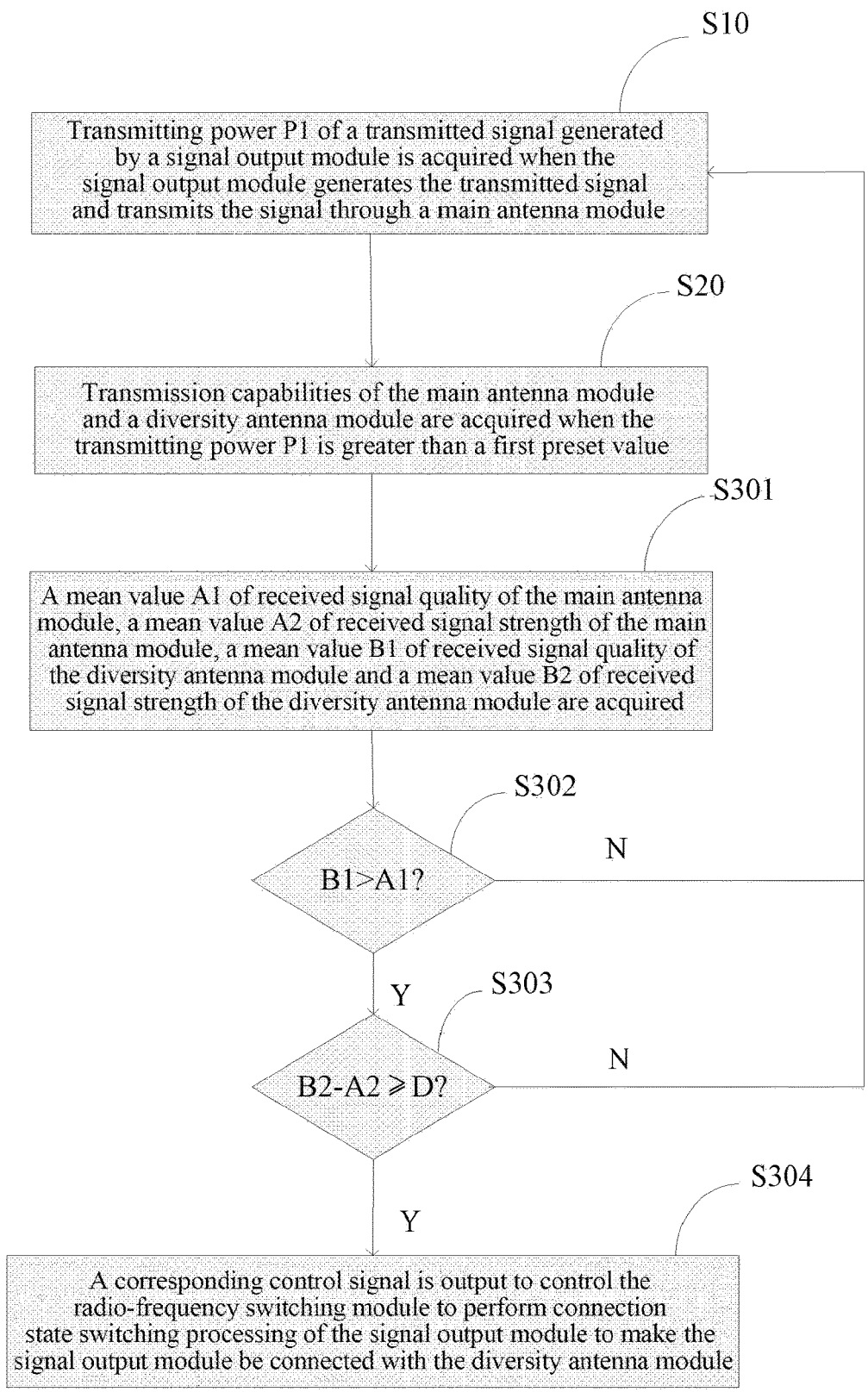
FIG. 4 illustrates a flowchart of another embodiment of the signal transmission method of the mobile communication terminal according to the present document.

Further referring to FIG. 4, the FIG. 4 illustrates a flowchart of another embodiment of the signal transmission method of the mobile communication terminal according to the present document. The step S30 includes the following steps.

In step S301, a mean value A1 of received signal quality of the main antenna module 2, a mean value A2 of received signal strength of the main antenna module 2, a mean value B1 of received signal quality of the diversity antenna module 3 and a mean value B2 of received signal strength of the diversity antenna module 3 are acquired.

In step S302, whether B1 is greater than A1 is judged; and when B1 is smaller than or equal to A1, it is to return to execute step S10.

In step S303, when B1 is greater than A1, whether a difference value between B2 and A2 is greater than or equal to a second preset value D is judged.

In step S304, when the difference value between B2 and A2 is greater than or equal to the second preset value D, a corresponding control signal is output to control the radio-frequency switching module 6 to perform connection state switching processing of the signal output module 1 to make the signal output module 1 be connected with the diversity antenna module 3; and when the difference value between B2 and A2 is smaller than the second preset value D, it is to return to execute step S10.

In the embodiment, it should be stated that, the better the received signal quality and the received signal strength of the main antenna module 2 are, the stronger the transmission capability thereof is. Similarly, the better the received signal quality and the received signal strength of the diversity antenna module 3 are, the stronger the transmission capability thereof is. When the signal output module 1 is connected with the main antenna module 2 and transmits the signal through the main antenna module 2, if the transmitting power P1 of the transmitted signal is greater than the first preset value, the loss of the signal transmitting link is relatively great. In order to reduce the loss of the transmitted signal, the transmission capabilities of the main antenna module 2 and the diversity antenna module 3 are analyzed, and specifically which one of the main antenna module 2 and the diversity antenna module 3 has superior received signal strength and received signal quality is judged. When the received signal strength and the received signal quality of the diversity antenna module 3 are superior to the received signal strength and the received signal quality of the main antenna module 2, a corresponding control signal is output to the radio-frequency switching module 6 to make the signal output module 1 be connected with the diversity antenna module 3 having the superior transmission capability, such that the loss of the transmitted signal is decreased and the call quality of the mobile communication terminal is improved. On the other hand, when the loss of the transmitting link is decreased, the transmitting power of the transmitted signal is correspondingly decreased, thereby the loss of energy for transmission of the mobile communication terminal can be reduced and the time of endurance of the mobile communication terminal is prolonged.

Figure 5:
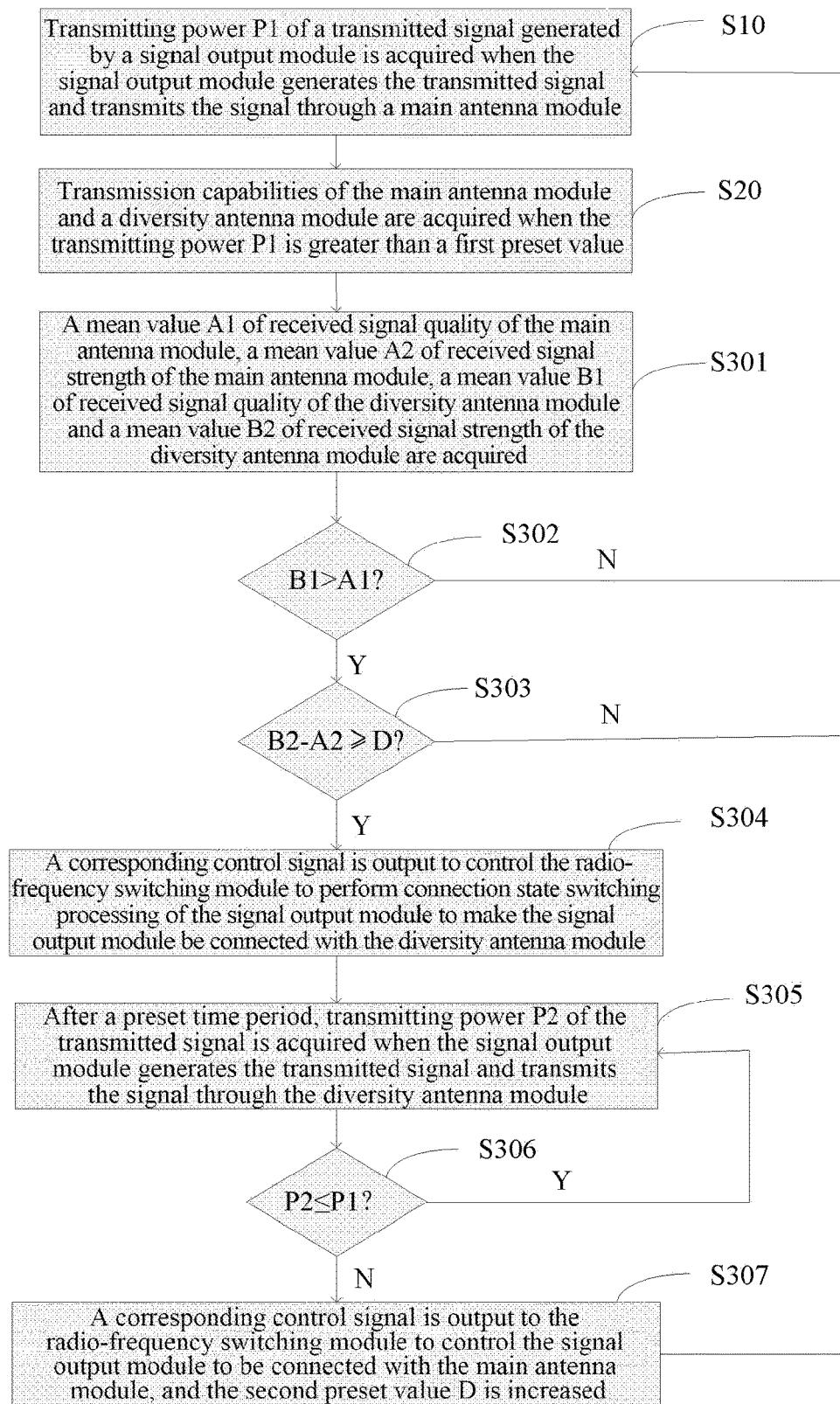
FIG. 5 illustrates a flowchart of another embodiment of the signal transmission method of the mobile communication terminal according to the present document.

Further referring to FIG. 5, the FIG. 5 illustrates a flowchart of another embodiment of the signal transmission method of the mobile communication terminal according to the present document. After step S304, the signal transmission method further includes:

In step S305, after a preset time period, transmitting power P2 of the transmitted signal is acquired when the signal output module 1 generates the transmitted signal and transmits the signal through the diversity antenna module 3.

In step S306, when the transmitting power P2 is smaller than or equal to P1, it is to return to execute the step of acquiring the transmitting power P2 of the transmitted signal when the signal output module 1 generates the transmitted signal and transmits the signal through the diversity antenna module 3.

In step S307, when the transmitting power P2 is greater than P1, a corresponding control signal is output to the radio-frequency switching module 6 to control the signal output module 1 to be connected with the main antenna module 2.

In the embodiment, after the radio-frequency switching module 6 controls the signal output module 1 to be switched from a state that the signal output module 1 is connected with the main antenna module 2 to a state that the signal output module 1 is connected with the diversity antenna module 3, the transmitting power P2 of the signal transmitted by the signal output module 1 through the diversity antenna module 3 is acquired. If P2 is greater than P1, it indicates that the loss of the signal transmitted through the diversity antenna module 3 is greater than the loss of the signal transmitted through the main antenna module 2. A control signal is output to the radio-frequency switching module 6 to control the signal output module 1 to be switched back to the state of being connected with the main antenna module 2. If P2 is smaller than or equal to P1, it indicates that the loss of the signal transmitted through the diversity antenna module 3 is smaller than the loss of the signal transmitted through the main antenna module 2. The signal output module 1 may still continue transmitting the signal through the diversity antenna module 3. The transmitting power is continually acquired. Once the transmitting power P2 is greater than P1, the signal output module 1 is switched back to the state of being connected with the main antenna module 2 to transmit the signal, such that the optimum transmitting link can be effectively acquired and the loss of the signal transmitted from the mobile communication terminal to the base station is decreased.

When step S307 is executed, the second preset value D is increased.

In the embodiment, after the signal output module 1 is switched from the state of being connected with the main antenna module 2 to the state of being connected with the diversity antenna module 3, when the transmitting power P2 of the signal transmitted by the signal output module 1 through the diversity antenna module 3 is greater than the transmitting power P1 before switching, the second preset value D is increased. In the embodiment, the second preset value D is increased by one. The second preset value D is used as a correction value, increasing the second preset value D can decrease the error when the transmission capabilities of the main antenna module 2 and the diversity antenna module 3 are judged at a next time, such that the judgment is prevented from entering an endless loop and the judgment accuracy of the transmission capabilities is improved. By increasing the second preset value D, it is guaranteed that the signal of the mobile communication terminal can be transmitted through the optimum transmitting link, the loss of the signal is decreased and the call quality of the mobile communication terminal is improved.

The above-mentioned embodiments are just preferred embodiments of the present document and shall not hereby limit the patent scope of the present document. Any equivalent structure or equivalent flow variations made by using the contents in the description and the drawings of the present document, which are or directly or indirectly applied to other related technical fields, shall be also included in the patent protection scope of the present document.

One skilled in the art can understand that all or partial steps in the above-mentioned method may be completed by relevant hardware instructed by a program, and the program may be stored in a computer readable storage medium such as a read only memory, a magnetic disk or a compact disk or the like. Alternatively, all or partial steps of the above-mentioned embodiments may also be implemented by using one or more integrated circuits. Correspondingly, each module/unit in the above-mentioned embodiments may be implemented by means of hardware, and may also be implemented by means of a software function module. The present document is not limited to combinations of hardware and software in any specific form.

INDUSTRIAL APPLICABILITY

According to the embodiments of the present document, the transmitted signal can be transmitted through the superior transmitting link, thereby the loss of the signal transmitted from the mobile communication terminal to the base station is decreased and the call quality of the mobile communication terminal is improved; and when the loss of the transmitting link is decreased, the transmitting power of the transmitted signal is correspondingly decreased, thereby the loss of energy for transmission of the mobile communication terminal can be reduced and the time of endurance of the mobile communication terminal is prolonged.

What is claimed is:

1. A mobile communication terminal, comprising a signal output module, a main antenna module and a diversity antenna module, and further comprising an acquisition module, a control module and a radio-frequency switching module, wherein the radio-frequency switching module comprises a common end, a controlled end, a first connection end and a second connection end, and the acquisition module comprises a first signal acquisition end, a second signal acquisition end, a third signal acquisition end and an acquired signal output end; the common end is connected with a transmitted signal output end of the signal output module, the controlled end is connected with a control signal output end of the control module, the first connection end is connected with the main antenna module and the second connection end is connected with the diversity antenna module; the first signal acquisition end is connected with a transmitting power output end of the signal output module, the second signal acquisition end is connected with the main antenna module, the third signal acquisition end is connected with the diversity antenna module and the acquired signal output end is connected with a signal receiving end of the control module;

the acquisition module is configured to acquire transmitting power P1 of a transmitted signal when the signal output module generates the transmitted signal and transmits the transmitted signal through the main antenna module, and acquire transmission capabilities of the main antenna module and the diversity antenna module when the transmitting power P1 is greater than a first preset value;

the control module is configured to output a control signal to the radio-frequency switching module according to the transmission capabilities of the main antenna module and the diversity antenna module; and the radio-frequency switching module is configured to control the signal output module to be connected with the main antenna module or the diversity antenna module according to the control signal.

2. The mobile communication terminal according to claim 1, wherein the transmission capabilities of the main antenna module and the diversity antenna module comprise received signal quality and received signal strength.

3. The mobile communication terminal according to claim 2, wherein the control module comprises a mean value acquisition unit, a judgment unit and a control signal output unit, wherein, the mean value acquisition unit is configured to acquire a mean value A1 of received signal quality of the main antenna module, a mean value A2 of received signal strength of the main antenna module, a mean value B1 of received signal quality of the diversity antenna module and a mean value B2 of received signal strength of the diversity antenna module;

the judgment unit is configured to judge whether the B1 is greater than the A1;

the acquisition module is further configured to, when the B1 is smaller than or equal to the A1, execute an operation of acquiring transmitting power P1 of a transmitted signal generated by the signal output module when the signal output module generates the transmitted signal and transmits the signal through the main antenna module;

the judgment unit is further configured to, when the B1 is greater than the A1, judge whether a difference value between the B2 and the A2 is greater than or equal to a second preset value;

the control signal output unit is configured to, when the judgment unit judges that the difference value between the B2 and the A2 is greater than or equal to the second preset value, output a control signal to control the radio-frequency switching module to perform connection state switching processing of the signal output module to make the signal output module be connected with the diversity antenna module; and the acquisition module is further configured to, when the judgment unit judges that the difference value between the B2 and the A2 is smaller than the second preset value, execute the operation of acquiring transmitting power P1 of a transmitted signal generated by the signal output module when the signal output module generates the transmitted signal and transmits the signal through the main antenna module.

4. The mobile communication terminal according to claim 3, wherein, the acquisition module is further configured to acquire transmitting power P2 of the transmitted signal when the signal output module generates the transmitted signal and transmits the signal through the diversity antenna module;

the judgment unit is further configured to judge whether the P2 is greater than the P1;

the acquisition module is further configured to, when the P2 is smaller than or equal to the P1, execute an operation of acquiring the transmitting power P2 of the transmitted signal when the signal output module generates the transmitted signal and transmits the signal through the diversity antenna module; and the control module is further configured to, when the P2 is greater than the P1, output a control signal to the radio-frequency switching module to control the signal output module to be connected with the main antenna module.

5. The mobile communication terminal according to claim 4, wherein the control module is further configured to, when outputting the corresponding control signal to the radio-frequency switching module to control the signal output module to be connected with the main antenna module when the transmitting power P2 is greater than the P1, increase the second preset value.

6. A signal transmission method of the mobile communication terminal according to claim 1, comprising:

acquiring the transmitting power P1 of the transmitted signal generated by the signal output module when the signal output module generates the transmitted signal and transmits the transmitted signal through the main antenna module;

acquiring transmission capabilities of the main antenna module and the diversity antenna module when the transmitting power P1 is greater than the first preset value; and outputting the control signal according to the transmission capabilities of the main antenna module and the diversity antenna module to control the radio-frequency switching module to perform connection state switching processing of the signal output module to make the signal output module be connected with the main antenna module or the diversity antenna module.

7. The signal transmission method of the mobile communication terminal according to claim 6, wherein the transmission capabilities of the main antenna module and the diversity antenna module comprise received signal strength and received signal quality.

8. The signal transmission method of the mobile communication terminal according to claim 7, wherein the step of outputting the corresponding control signal according to the transmission capabilities of the main antenna module and the diversity antenna module to control the radio-frequency switching module to perform connection state switching processing of the signal output module to make the signal output module be connected with the diversity antenna module comprises:

acquiring a mean value A1 of received signal quality of the main antenna module, a mean value A2 of received signal strength of the main antenna module, a mean value B1 of received signal quality of the diversity antenna module and a mean value B2 of received signal strength of the diversity antenna module;

judging whether the B1 is greater than the A1;

when the B1 is smaller than or equal to the A1, returning to execute the step of acquiring the transmitting power P1 of the transmitted signal generated by the signal output module when the signal output module generates the transmitted signal and transmits the signal through the main antenna module;

when the B1 is greater than the A1, judging whether a difference value between the B2 and the A2 is greater than or equal to a second preset value;

when the difference value between the B2 and the A2 is greater than or equal to the second preset value, outputting a control signal to control the radio-frequency switching module to perform the connection state switching processing of the signal output module to make the signal output module be connected with the diversity antenna module; and when the difference value between the B2 and the A2 is smaller than the second preset value, returning to execute the step of acquiring the transmitting power P1 of the transmitted signal generated by the signal output module when the signal output module transmits the signal through the main antenna module.

9. The signal transmission method of the mobile communication terminal according to claim 8, wherein, after the step of outputting the control signal to control the radio-frequency switching module to perform the connection state switching processing of the signal output module to make the signal output module be connected with the diversity antenna module when the difference value between the B2 and the A2 is greater than or equal to the second preset value, the signal transmission method further comprises:

after a preset time period, acquiring transmitting power P2 of the transmitted signal when the signal output module generates the transmitted signal and transmits the signal through the diversity antenna module;

when the P2 is smaller than or equal to the P1, returning to execute the step of acquiring transmitting power P2 of the transmitted signal when the signal output module generates the transmitted signal and transmits the signal through the diversity antenna module; and when the P2 is greater than the P1, outputting a corresponding control signal to the radio-frequency switching module to control the signal output module to be connected with the main antenna module.

10. The signal transmission method of the mobile communication terminal according to claim 9, wherein, when executing the step of outputting a corresponding control signal to the radio-frequency switching module to control the signal output module to be connected with the main antenna module when the P2 is greater than the P1, the second preset value is increased.

* * * * *